(12) United States Patent
Stroud et al.

(10) Patent No.: US 9,677,504 B2
(45) Date of Patent: Jun. 13, 2017

(54) ROCKETS, METHODS OF ROCKET CONTROL AND METHODS OF ROCKET EVALUATION UTILIZING PRESSURE COMPENSATION

(75) Inventors: Sean S. Stroud, Healdsburg, CA (US); Michael J. Piovoso, Wilmington, DE (US)

(73) Assignee: ORBITAL ATK, INC., Plymouth, MN (US)

( * ) Notice: Subject to any disclaimer, the term of this patent is extended or adjusted under 35 U.S.C. 154(b) by 2051 days.

(21) Appl. No.: 12/777,508

(22) Filed: May 11, 2010

(65) Prior Publication Data

US 2011/0277446 A1 Nov. 17, 2011

(51) Int. Cl.
*F02K 9/08* (2006.01)
*F02K 9/80* (2006.01)
*F02K 9/58* (2006.01)

(52) U.S. Cl.
CPC ............... *F02K 9/80* (2013.01); *F02K 9/08* (2013.01); *F02K 9/58* (2013.01); *F05D 2200/23* (2013.01); *F05D 2200/24* (2013.01); *F05D 2270/12* (2013.01); *F05D 2270/13* (2013.01); *F05D 2270/701* (2013.01)

(58) Field of Classification Search
USPC .......... 60/201, 228, 229, 233–235, 237–240, 60/253–256; 239/265.11; 701/13; 700/301
See application file for complete search history.

(56) References Cited

U.S. PATENT DOCUMENTS

| | | | | |
|---|---|---|---|---|
| 3,586,844 A | * | 6/1971 | Hanbicki | 708/517 |
| 3,948,042 A | * | 4/1976 | Beardsley et al. | 60/242 |
| 4,015,427 A | * | 4/1977 | Brooks | 60/253 |
| 4,071,886 A | * | 1/1978 | Eicher | 700/28 |
| 4,738,100 A | * | 4/1988 | Koorey | 60/256 |
| 4,777,795 A | | 10/1988 | Le Corre et al. | |

(Continued)

FOREIGN PATENT DOCUMENTS

| | | |
|---|---|---|
| JP | 4101052 A | 4/1992 |
| JP | H06-299904 A | 10/1994 |
| JP | H07-127527 A | 5/1995 |

OTHER PUBLICATIONS

Hill, P. and C. Peterson, Mechanics and Thermodynamics of Propulsion, Addison-Wesley, Reading, MA 1965, pp. 19, 323-24, 330-37.*

(Continued)

*Primary Examiner* — Arun Goyal
(74) *Attorney, Agent, or Firm* — TraskBritt

(57) ABSTRACT

Rockets, rocket motors, methods of controlling a rocket and methods of evaluating a rocket design are disclosed. In some embodiments, a method of controlling a rocket may include measuring a combustion chamber pressure, calculating a logarithm of the measured combustion chamber pressure, and computing the difference between the logarithm of the measured combustion chamber pressure and the logarithm of a reference combustion chamber pressure value to generate an error signal. The method may further include filtering the error signal to generate a compensated signal in the logarithm domain, and exponentiating of the compensated signal in the logarithm domain to provide a compensated signal in the physical domain.

13 Claims, 4 Drawing Sheets

(56) References Cited

U.S. PATENT DOCUMENTS

| | | | |
|---|---|---|---|
| 5,062,593 A | 11/1991 | Goddard et al. | |
| 5,172,547 A | 12/1992 | Lawrence et al. | |
| 5,456,425 A * | 10/1995 | Morris et al. | 244/3.22 |
| 6,393,830 B1 | 5/2002 | Hamke et al. | |
| 6,415,272 B1 * | 7/2002 | Ulyanov | 706/2 |
| 6,463,371 B1 * | 10/2002 | Ulyanov et al. | 701/40 |
| 6,609,060 B2 * | 8/2003 | Ulyanov et al. | 701/106 |
| 6,721,718 B2 * | 4/2004 | Ulyanov | 706/2 |
| 7,058,896 B2 * | 6/2006 | Hughes | 715/757 |
| 7,441,473 B2 * | 10/2008 | MacCallum et al. | 73/865.6 |
| 7,467,762 B1 * | 12/2008 | Parsons | 244/3.14 |
| 7,716,912 B2 * | 5/2010 | Cover et al. | 60/228 |
| 7,844,352 B2 * | 11/2010 | Vouzis et al. | 700/44 |
| 8,539,751 B2 * | 9/2013 | Cover et al. | 60/204 |
| 2005/0120703 A1 * | 6/2005 | Rohrbaugh et al. | 60/229 |
| 2007/0204593 A1 | 9/2007 | Cover et al. | |
| 2008/0098711 A1 | 5/2008 | DiSalvo et al. | |
| 2010/0269484 A1 | 10/2010 | Baker et al. | |

OTHER PUBLICATIONS

Naminosuke Kubota, Propellants and Explosives, 2007, Wiley and Sons, pp. 405-437.*

Search Report under Section 17(5), Patents Act 1977, issued by the U.K. Intellectual Property Office on Aug. 30, 2011, Application No. GB1107444.0; four (4) pages.

Jacobs et al., U.S. Statutory Invention Registration No. H747, published Feb. 6, 1990.

Ivanov et al., Pressure Control in a Semi-Closed Volume upon Combustion of Solid Propellants with an Exponent in the Combustion Law Greater than Unity, Combustion, Explosion, and Shock Waves, vol. 36, No. 5, 2000, pp. 591-600.

Ivanov et al., Estimate of the Dynamic Characteristics of Unsteady Combustion of a Solid Propellant in a Semi-Closed Volume from Measurements of Variable Pressure, Combustion, Explosion, and Shock Waves, vol. 38, No. 1, 2002, pp. 71-80.

* cited by examiner

ROCKETS, METHODS OF ROCKET CONTROL AND METHODS OF ROCKET EVALUATION UTILIZING PRESSURE COMPENSATION

TECHNICAL FIELD

Embodiments of the invention relate to control systems and methods for controlling pressure in rocket motors, such as solid propellant rocket motors, and for evaluating rocket designs.

BACKGROUND

Solid propellant rocket motors employ a propellant comprising a solid fuel charge or "grain" which burns to generate exhaust gases and other combustion products, which are expelled through one or more nozzles of the rocket motor to provide thrust. Once a grain of solid propellant is ignited, it is difficult to extinguish and the entire grain is ordinarily consumed after ignition. Additionally, effecting variation of thrust is more difficult in solid propellant than in liquid propellant rocket engines. However, simple structural design of solid propellant rocket motors and ease of storage of the solid propellant are advantages of the solid propellant motor.

Methods of controlling the thrust of a solid propellant motor often involve complicated control schemes, which may require extensive computing power and/or multiple controllers so that the rocket may operate over a wide range of operating conditions.

In view of the foregoing, it would be desirable to have control systems and methods to control the thrust of a solid propellant rocket motor that utilize relatively easily acquired system data, such as pressure, and compensate for unknown variables. Additionally, it would be desirable if the control systems and methods required relatively little computing power and utilized a controller that is operable over a relatively large range of operating conditions, such as over a relatively large range of pressures. Furthermore, it would be desirable to simulate and evaluate rocket designs utilizing control methods that require relatively little computing power.

BRIEF SUMMARY

In some embodiments, a method of controlling a rocket may include measuring a combustion chamber pressure, calculating a logarithm of the measured combustion chamber pressure, and calculating the difference between the logarithm of the measured combustion chamber pressure and a logarithm of a reference combustion chamber pressure value to generate an error signal. The method may further include filtering the error signal to generate a compensated total flow area control signal in the logarithm domain with a controller, exponentiating the compensated total flow area control signal in the logarithm domain to provide a compensated total flow area control signal in the physical domain, and moving at least one valve in response to the compensated total flow area control signal in the physical domain.

In additional embodiments, a rocket may include a combustion chamber, a pressure sensor for measuring a pressure of the combustion chamber, at least one valve for regulating a gas flow from the combustion chamber, and a controller configured to receive pressure measurements from the pressure sensor. The controller may be further configured and programmed to calculate a logarithm of a signal from the pressure sensor, determine an error signal, filter the error signal to determine a compensated control signal in the logarithm domain, and exponentiate the compensated control signal to provide a compensated control signal in the physical domain and to cause the at least one valve to be positioned in response to the compensated control signal in the physical domain.

In further embodiments, a method of evaluating a rocket design with a computer simulation system may include inputting parameters for a rocket design into a memory component of the computer simulation system, calculating a logarithm of the calculated combustion pressure and calculating the difference between the logarithm of the calculated combustion pressure and a logarithm of a predetermined pressure to determine an error value, filtering the error value to determine a compensated control signal in the logarithm domain, and exponentiating the compensated control signal in the logarithm domain to determine a compensated control signal in the physical domain.

DETAILED DESCRIPTION

Figure 1:
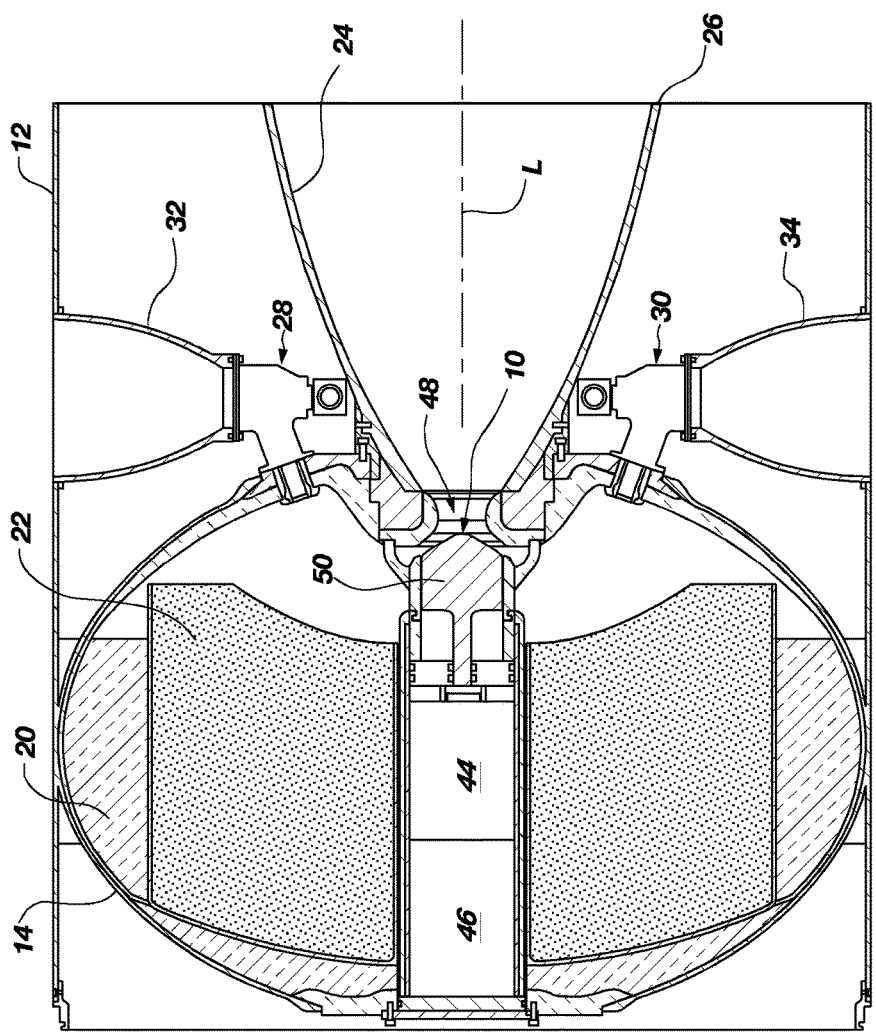
FIG. 1 shows a longitudinal cross-sectional view of a rocket motor for a rocket, according to an embodiment of the present invention.

In some embodiments, a rocket motor for a rocket may comprise an upper or final stage rocket motor, such as depicted in FIG. 1. The motor case assembly may comprise a motor case housing 12 that houses the pressure vessel 14 (also sometimes termed a "motor case") having a plurality of valves 10, 28, 30, 36a, 36b, 38a, 38b (FIGS. 1 and 2) in communication therewith. Within the pressure vessel 14, an insulating lining, such as a low density foam 20, may at least partially surround and insulate a solid propellant grain 22.

The solid propellant grain 22 may include a free-standing class 7 HMX (cyclotetramethylenetetranitramine)-oxidized composite propellant with a binder system based on hydroxyl-terminated polybutadiene (HTPB) polymer and cured with isophorene diisocyanate (IPDI) curative including a small amount of carbon black as an opacifier, the propellant being formulated to burn relatively stably over a wide pressure range. In additional embodiments, the solid propellant grain 22 may comprise, for example, an aluminum powder-fueled, hydroxyl-terminated polybutadiene (HTPB) polymer-based binder. However, the solid propellant chosen for use may be any suitable propellant known to one of ordinary skill in the art. The solid propellant grain 22 may burn to generate exhaust gases and other combustion products, which are expelled from the rocket motor to provide thrust. Once the solid propellant grain 22 is ignited, it may be difficult to extinguish and the entire grain is ordinarily consumed after ignition.

Figure 2:
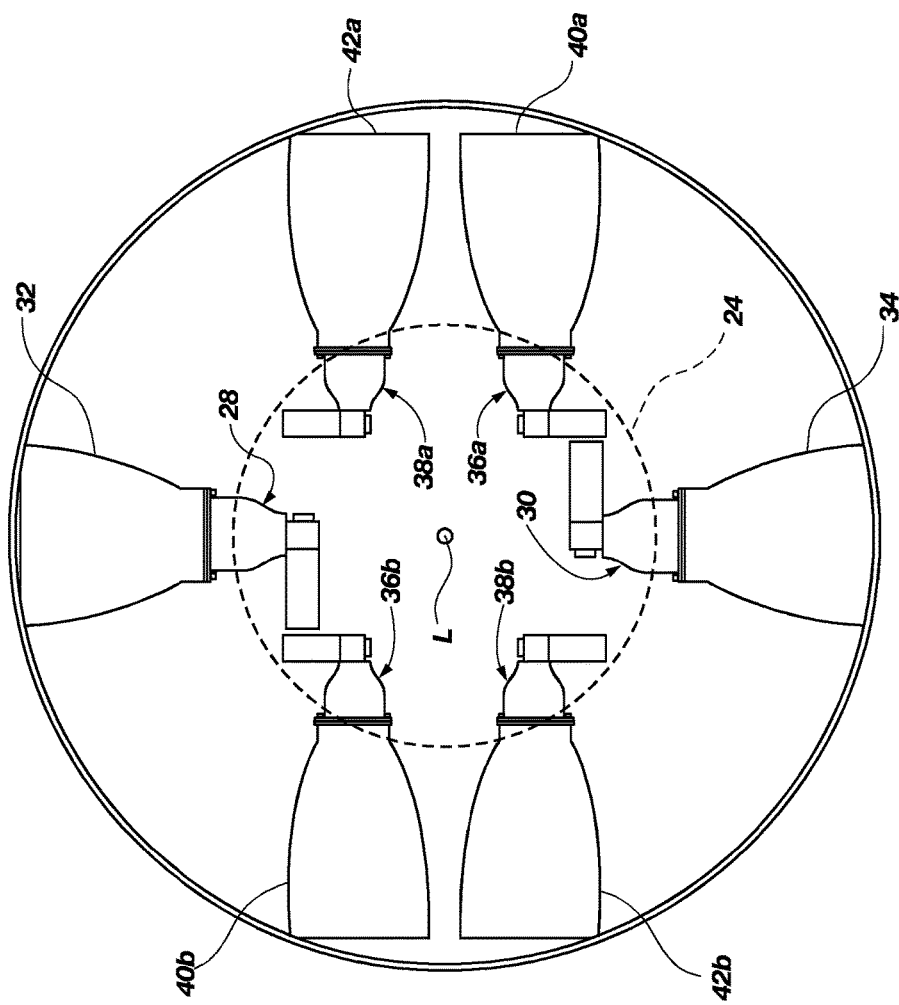
FIG. 2 shows a schematic axial view of the maneuver control valves and maneuver control thrusters of the rocket motor of FIG. 1.

In some embodiments, an axial thrust valve 10 may be configured as a pintle valve configured for proportional operation and control of axial thrust through an axial thruster 26. As shown in FIG. 2, which illustrates the exit cone 24 of the axial thruster 26 in broken lines for clarity, maneuver control thrusters 32, 34, 40a, 40b, 42a, 42b may be operably coupled to maneuver control valves 28, 30, 36a, 36b, 38a, 38b, respectively, and may be located and oriented to effect maneuvering functions including pitch, yaw and roll control. Additionally, the maneuver control valves 28, 30, 36a, 36b, 38a, 38b may be configured as proportional valves.

Valves are known that may be configured to operate in either "open" or "closed" states. Additionally, valves which include at least a third or "partially open" operational state are known as "proportional valves." The state of each valve may be determined by the transverse, open cross-sectional area of the orifice or "throat" for each valve.

Additionally, the rocket motor may include one or more pressure sensors 56 (FIG. 3) (i.e., pressure transducers) positioned to measure the chamber pressure within the pressure vessel 14. Likewise, temperature sensors may be included to measure the chamber temperature, and accelerometers may also be included to provide a measurement by which thrust may be predicted or system performance monitored. Feedback from the accelerometers may also be used in a closed loop control system to control desired parameters of the propulsion system.

As shown in FIG. 2, selective operation of two maneuver control valves 28, 30 with respectively associated coplanar maneuver control thrusters 32, 34 located 180° apart and oriented transverse to the longitudinal axis L of the rocket motor may be used for pitch control. Yaw control may be effected by selective operation of either paired maneuver control thrusters 40a and 42a by maneuver control valves 36a and 38a or paired and diametrically opposed maneuver control thrusters 40b and 42b by maneuver control valves 36b and 38b. As shown, the paired maneuver control thrusters 40a, 42a and 40b, 42b may be coplanar, oriented transverse to longitudinal axis L of the rocket motor and may be used to provide balanced, parallel thrust vectors to either side of longitudinal axis L at identical lateral offsets therethrough.

Increasing the total outlet flow area by opening any of the aforementioned valves 10, 28, 30, 36a, 36b, 38a, 38b during combustion of solid propellant grain 22 will decrease pressure within the pressure vessel 14. Such a reduction in pressure within the pressure vessel 14 will reduce the burn rate of the propellant and, therefore, diminish thrust.

With all of the attitude control valves maintained in a fixed position, such as in a fully closed position, higher operating pressure within pressure vessel 14 and correspondingly higher thrust may be accomplished by partially closing the axial thrust valve 10. Partially closing the axial thrust valve 10 will reduce the effective transverse cross-sectional area of the nozzle throat 48, which may result in a higher operating pressure and therefore higher thrust. This may increase the velocity of the rocket and decrease the mission time. As noted above, the axial thrust valve 10 may be configured as a pintle valve, with an actuator 44 powered by a battery 46, the actuator 44 configured to move a pintle element 50 toward and away from a nozzle throat 48, so as to change the nozzle throat area to alter pressure within the pressure vessel 14 and resulting thrust. While only a single axial thrust valve and associated axial thruster are depicted and described with reference to the foregoing embodiment, it is contemplated that more than one axial thrust valve and associated axial thruster may be included in additional embodiments. Maneuver control valves 28, 30, 36a, 36b, 38a and 38b may, as with axial thrust valve 10, be actuated by battery-powered actuators (not shown) powered by one or more other batteries, such as a battery 46. In additional embodiments, the valves may be powered by a fuel cell. In additional embodiments, each valve may be a proportional valve that may be controlled by one or more of an electrically, pneumatically, hydraulically, and mechanically powered system, they may be linearly or nonlinearly acting in their modes of operation.

Figure 3:
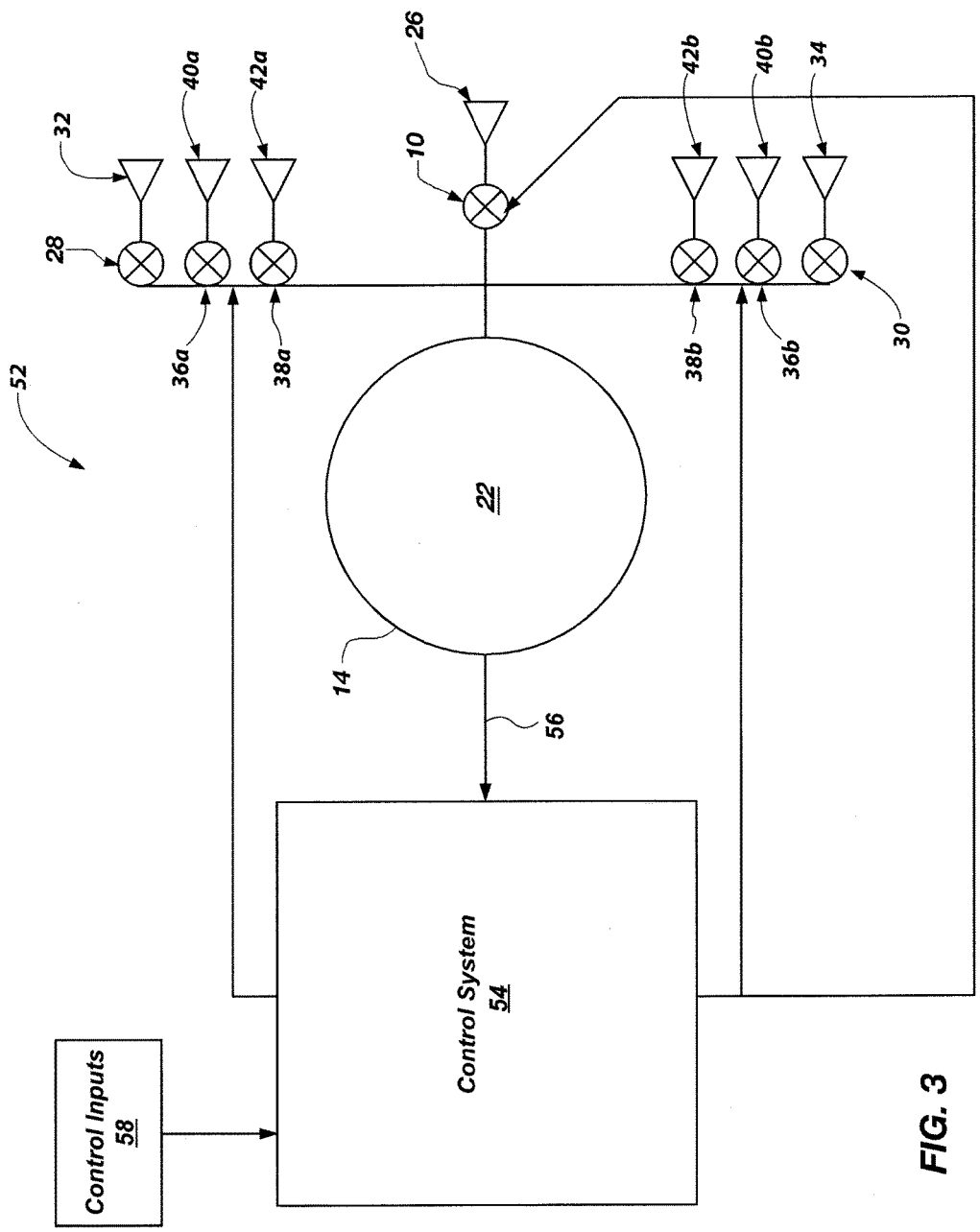
FIG. 3 is a schematic diagram of the rocket motor of FIG. 1.

FIG. 3 depicts, in schematic form, an embodiment of a rocket motor system 52 including one or more rocket motors, such as described with reference to FIGS. 1 and 2, and a control system 54. The rocket motor may be configured as a solid propellant engine or as a hybrid engine. The details of the structure of and suitable propellants, oxidizers and ignition sources are known to those of ordinary skill in the art, and may also be found, for example, in U.S. Pat. No. 6,393,830, assigned to the assignee of the present invention and the disclosure of which patent is incorporated herein by reference.

In some embodiments, a method for controlling the state of each of the valves relies upon pressure measurements that are used as the control inputs or process variables to the control system 54. The control inputs 58 in this mode of control are a total thrust command, a thrust vector command, and a chamber pressure command. A net thrust per valve set ($F_{net,i}$) is derived from the thrust vector command. As used herein, net thrust is defined as the differential thrust between opposing nozzles and thrust from a nozzle that does not correspond to any opposing nozzle.

According to standard ballistic equations, the total throat area to obtain a given chamber pressure is given in the following equation:

$$A_t = (C^* \rho A_s r (P_c/P_{ref})^n)/(g_c P_c)$$

where: $\rho$=density of propellant [lbm/in$^3$]
$P_{ref}$=reference pressure [lbf/in$^2$]
$A_s$=surface area of propellant [in$^2$]
n=exponent
r=burn rate at $P_{ref}$ [in/sec]
$A_t$=throat flow area of valve i [in$^2$]
$P_c$=gas generator pressure [lbf/in$^2$]
$g_c$=gravitational constant [(lbm/lbf)(ft/s$^2$)]
$C^*$=characteristic exhaust velocity [ft/sec]

The net thrust from a given valve set is proportional to a gas generator (GG) pressure (i.e., the pressure of the pressure vessel 14) and difference in regulated throat areas of opposing valves:

$$F_{net,i} = (A_{t,i} - A_{t,j}) P C_F,$$

where valves i and j comprise a valve set and provide thrust in opposite directions.

As shown in FIG. 3, the control system 54 may be configured to operate each valve 10, 28, 30, 36a, 36b, 38a and 38b of the rocket motor to accomplish a mission objective. Additionally, the control system 54 may be configured to receive signals from one or more sensors, such as one or more combustion chamber pressure sensors 56. The control system 54 may analyze commands to meet mission objectives, analyze signals from one or more sensors 56, compensate for conditions that are unanticipated, unknown or difficult to predict, and determine an appropriate system response, such as the appropriate positioning of one or more valves 10, 28, 30, 36a, 36b, 38a, 38b, to meet the mission objectives. For example, the control system 54 may receive one or more of a total thrust command, a thrust vector command and a chamber pressure command. The control system 54 may then position the valves 10, 28, 30, 36a, 36b, 38a, 38b to a position predicted to meet the command and determine a pressure command to meet the command. After the valves 10, 28, 30, 36a, 36b, 38a, 38b have been positioned, or as the valves 10, 28, 30, 36a, 36b, 38a, 38b are positioned, the control system 54 may receive a signal from the pressure sensor 56 and may calculate an error value. The control system 54 may then utilize the error value to calculate a compensated valve position command, and deliver the compensated valve position command to the valve controllers to position the valves 10, 28, 30, 36a, 36b, 38a, 38b to a new position to reduce the error between the pressure command and the measured pressure. The signal from the pressure sensor 56 may be repeatedly received and compared to the pressure command by the control system 54 and, any time a non-zero error value is calculated, a compensated valve position command may be generated to reduce the error between the measured pressure and the command pressure.

Figure 4:
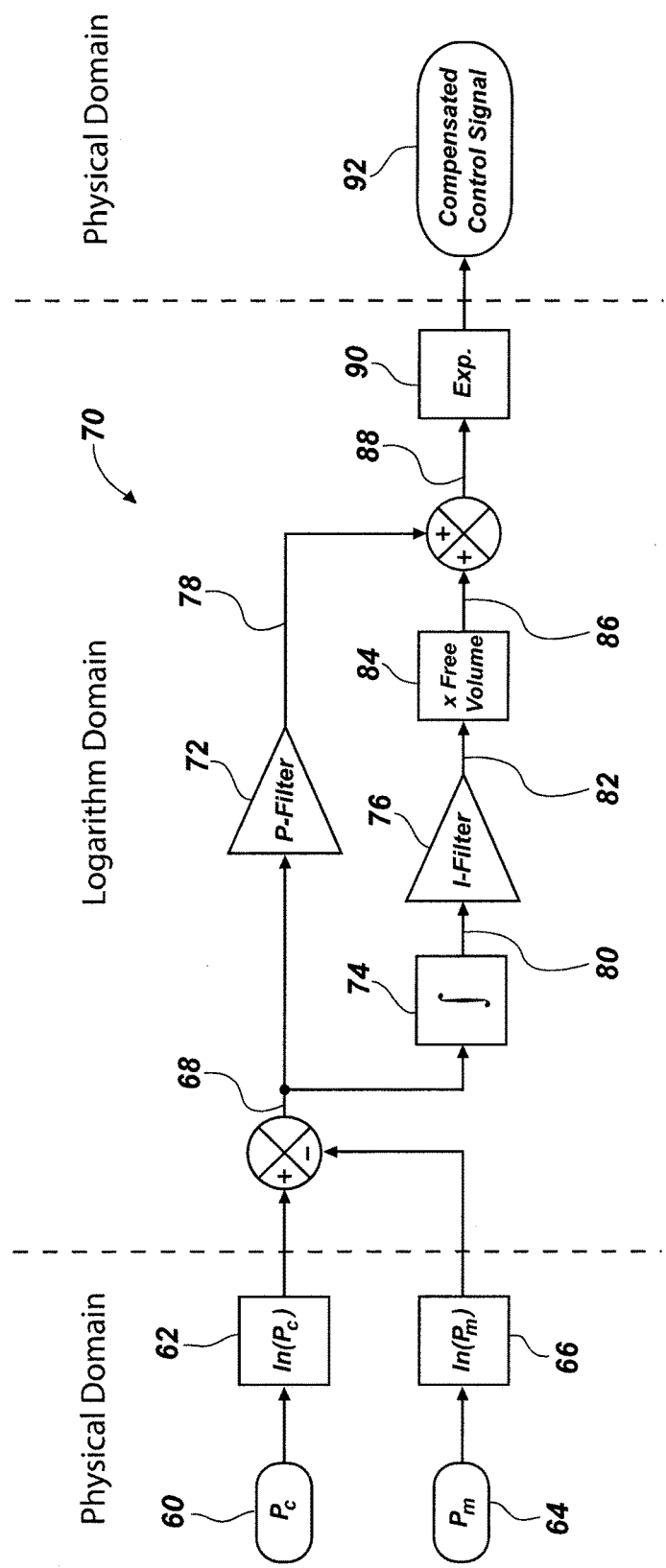
FIG. 4 is a flowchart illustrating a pressure compensator for a rocket motor, such as shown in FIG. 1.

As shown in FIG. 4, to facilitate the calculation of a compensated command, such as a compensated valve position command, a controller of the control system 54 may convert the input signals into the logarithm domain. For example, the controller may convert a pressure command 60 ($P_c$) to the natural logarithm of the pressure command 62 ($\ln(P_c)$) and a measured pressure 64 ($P_m$) into the natural logarithm of the measured pressure 66 ($\ln(P_m)$). The difference between the natural logarithm of the pressure command 62 and the natural logarithm of the measured pressure 66 may be calculated to determine an error value 68 (i.e., $\ln(P_c)-\ln(P_m)$=error value). The error value 68 may then be utilized to calculate a gain value in the logarithm domain utilizing one or more controllers, such as a proportional-integral (PI) controller 70 having a proportional gain filter 72, an integrator 74 and integral gain filter 76. In the PI controller 70, the error value 68 may be utilized by the proportional gain filter 72 to calculate a proportional gain 78. Additionally, the error value 68 may be integrated by the integrator 74 to provide an integrated error value 80 and the integrated error value 80 may be utilized to calculate a integral compensated value 82 that may be multiplied by the free volume 84 to calculate an integral gain 86. In some embodiments, a constant value may represent the free volume 82 (i.e., the space that is not occupied by solid material) within the combustion chamber. In additional embodiments, the value representing the free volume 84 may change over time as the free volume within the combustion chamber increases, such as according to a predetermined function or table. The proportional gain 78 and the integral gain 86 may then be summed to provide a total gain 88 in the logarithm domain. An exponentiator 90 may then calculate the antilogarithm of the total gain 88 and a compensated control signal 92 in the physical domain may be provided.

As a complication to thrust control utilizing a pressure control methodology, inputs into a controller and their relationship to controller outputs may be non-linear in the physical domain. For example, the relationship between a size of a combined opening of the valves and the pressure of a combustion chamber may not be related linearly (i.e., burn rate is a non-linear function of chamber pressure). This has made it difficult to utilize pressure compensation schemes that may compensate for unknown variables and provide a precisely controlled pressure response. However, the relationship between the logarithm of the chamber pressure and the logarithm of the size of the combined opening of the valves 10, 28, 30, 36a, 36b, 38a, 38b may be substantially linear. In view of this, linear control theory and linear controllers, such as the PI controller 70 may be utilized over the range of operation of a rocket when utilizing such controllers in the logarithm domain as described herein.

A transfer function (i.e., $G_p(s)$), which is typically a mathematical representation of the relationship between the input and the output of a linear time-invariant system utilized by a controller, but in this case is a mathematical representation of the relationship between the logarithm of the input and the logarithm of the output of the control system 54, for use by the PI controller 70 may be represented by:

$$G_p(s)=K_p/(\tau_p s+1);$$

wherein:

$K_p=1/(N-1)$;
N is the burn rate exponent;
$\tau_p$ is the plant time constant, which may be represented by:

$$1/\tau_p=-\{(K_{gas}/V_c)*((N-1)/P_c)*(\rho A_B R_B)*((P_c/P_m)^N)\};$$

$V_c$ is the free volume of the combustion chamber;
$\rho$ is the propellant density;
$A_B$ is burn surface area;
$R_B$ is the burn rate at a reference pressure;
$K_{gas}=12RT/MW$;
R is the ideal gas constant;
T is the gas temperature; and
MW is the molecular weight of the gas.

The function $G_p(s)$ may then be utilized to analytically calculate the control gains for the proportional filter 72. For example, the proportional filter 72 gain $K_c$ and integral filter 76 gain $K_i$ for the PI controller 70 may be determined, as represented by:

$$K_i=CL_x^2/(\tau_p K_p)$$

and $$K_c=(2\zeta CL_x-1)/K_p$$

wherein:

$\zeta$ is a damping ratio; and
$CL_x$ is a closed-loop factor defined by:

$$CL_x=\omega_n \tau_p$$

wherein:

$\omega_n$ is a natural frequency of the system.

The integral controller gain $K_i$ may be further simplified for a discrete time. For example, a linear volume estimator may be utilized to estimate the increasing chamber free volume over time and the integral controller gain $K_i$ may be represented by:

$$K_i[n]=(CL_x^2/K_p)*(V_{c0}/V_{est}[n])*(1/\tau_{p0})$$

wherein:

$V_{c0}$ is the initial free chamber volume;
$V_{est}[n]$ is the chamber free volume estimate; and
$\tau_{p0}$ is the open-loop time constant at the initial chamber free volume.

In addition to calculating system gain and providing an accurate control response, the control system may be utilized to vary system response time and system efficiency in-flight, tailored to meet mission objectives. For some mission stages the control system may facilitate a relatively fast system response to a command, such as a change in net thrust, and for some mission stages the control system may facilitate a relatively efficient use of fuel. The controller may facilitate such system variation by utilizing a pressure set-point, which may be the command pressure for the engine for a specific mission stage. For example, if a relatively rapid change in thrust may be anticipated for a particular mission stage, the pressure set-point may be set to a pressure value that is higher than the pressure required to meet a current net thrust requirement; but rather, may be set to a pressure value that is high enough to meet an anticipated net thrust requirement. When the pressure is set to a value that is higher than the current net thrust requirement, gas may be vented through opposing valves, which may reduce the fuel efficiency of the system. However, when an increase in net thrust is required, the system may reposition the valves to achieve the increased net thrust requirement without increasing the pressure of the combustion chamber, which may enable an increase in thrust to be achieved in the time it takes to reposition the valves. The pressure set-point $P_{set}$ may be set to meet a maximum anticipated thrust $F_{max}$ prior to when the maximum anticipated thrust $F_{max}$ is anticipated to be needed. The pressure set-point may be determined according to the following equation:

$$P_{set} = F_{max}/(C_f A_{max})$$

wherein:
$C_f$ is the thruster(s) discharge coefficient; and
$A_{max}$ is the valve(s) maximum flow area.

If fuel efficiency is more important than response time for a particular mission or particular stage of a mission, the pressure set-point may be set at or near the minimum pressure needed to meet a net thrust command. The pressure set-point may be chosen to best meet the performance and fuel efficiency requirements for any particular mission or mission phase. In view of this, the pressure set-point may be changed at any point during a flight, such as by one or more of an external signal and a predetermined schedule programmed into the controller.

Additionally, the control methods described herein may be utilized to evaluate a rocket design, such as with a computer simulation system. For example, parameters for a specific rocket design may be input into a memory component of the computer simulation system and a combustion chamber pressure value for the rocket design may be calculated. Next, a logarithm of the calculated combustion pressure may be calculated. An error value may then be determined by calculating the difference between the logarithm of the calculated combustion pressure and a logarithm of a predetermined pressure. The error value may then be filtered to determine a compensated control signal in the logarithm domain, such as with a PI filter in a manner similar to that described with reference to FIG. 4. Finally, an antilogarithm of the compensated control signal in the logarithm domain may be calculated by exponentiating the compensated control signal in the logarithm domain to determine a compensated control signal in the physical domain. Pressure set point values may also be utilized in evaluating the rocket design in a manner similar to use in operating a rocket as described herein.

Although this invention has been described with reference to particular embodiments, the invention is not limited to these described embodiments. Rather, the invention is limited only by the appended claims, which include within their scope all equivalent devices, systems and methods. Additions, deletions, and modifications to the disclosed embodiments may be effected without departing from the scope of the invention as claimed herein. Similarly, features from one embodiment may be combined with those of another while remaining within the scope of the invention.

What is claimed is:

1. A method of controlling a rocket, the method comprising:
   measuring a combustion chamber pressure within a combustion chamber of the rocket;
   calculating a logarithm of the measured combustion chamber pressure;
   calculating a difference between the logarithm of the measured combustion chamber pressure and a logarithm of a reference combustion chamber pressure value to generate an error signal;
   filtering the error signal to generate a compensated total flow area control signal in a logarithm domain with a controller, wherein the filtering the error signal comprises filtering the error signal with a proportional-plus-integral filter;
   exponentiating the compensated total flow area control signal in the logarithm domain to provide a compensated total flow area control signal in a physical domain;
   moving at least one valve in communication with the combustion chamber in response to the compensated total flow area control signal in the physical domain; and
   changing a gain of an integrating filter of the proportional-plus-integral filter as a free volume of the combustion chamber increases.

2. The method of claim 1, wherein the changing the gain of the integrating filter comprises changing the gain according to a predetermined gain schedule.

3. The method of claim 1, further comprising:
   positioning the at least one valve in response to the compensated total flow area control signal in the physical domain to regulate the pressure of the combustion chamber.

4. The method of claim 1, wherein the at least one valve comprises a plurality of valves, and further comprising:
   positioning the plurality of valves in response to the compensated total flow area control signal in the physical domain to regulate the pressure of the combustion chamber.

5. The method of claim 1, further comprising:
   determining a pressure set point and utilizing the pressure set point as the reference combustion chamber pressure value.

6. The method of claim 5, wherein the determining the pressure set point comprises:
   calculating a pressure required to meet a highest net thrust command relative to an available throat area for a valve set utilizing specific valve characteristics;
   calculating all pressures required to meet of the net thrust requirements utilizing propellant characteristics; and
   choosing a maximum of the calculated pressures.

7. The method of claim 5, wherein the determining the pressure set point comprises:
   determining a maximum anticipated thrust;
   calculating a pressure required to meet the maximum anticipated thrust; and
   utilizing the pressure required to meet the maximum anticipated thrust as the pressure set point while meeting a present thrust requirement that is less than the maximum anticipated thrust.

8. The method of claim 5, wherein the determining the pressure set point comprises:
   determining a present thrust requirement;
   calculating a pressure required to meet the present thrust requirement; and
   utilizing the pressure required to meet the present thrust requirement as the pressure set point.

9. A method of evaluating a rocket design with a computer simulation system, the method comprising:

inputting parameters for the rocket design into a memory component of the computer simulation system;

calculating a combustion chamber pressure value for the rocket design;

calculating a logarithm of the combustion chamber pressure and calculating the difference between the logarithm of the combustion chamber pressure and a logarithm of a predetermined pressure to determine an error value;

filtering the error value to determine a compensated control signal in a logarithm domain; and exponentiating the compensated control signal in the logarithm domain to determine a compensated control signal in a physical domain.

10. The method of claim 9, wherein the filtering the error signal further comprises filtering the error signal with a proportional-plus-integral filter.

11. The method of claim 10, further comprising changing a gain of an integrating fiber of the proportional-plus-integral filter according to a calculated combustion chamber free volume.

12. The method of claim 11, wherein the changing the gain of the integrating filter comprises changing the gain according to a predetermined gain schedule.

13. The method of claim 9, further comprising determining a pressure set point and utilizing the pressure set point as a reference combustion chamber pressure value.

* * * * *

UNITED STATES PATENT AND TRADEMARK OFFICE
CERTIFICATE OF CORRECTION

PATENT NO. : 9,677,504 B2  
APPLICATION NO. : 12/777508  
DATED : June 13, 2017  
INVENTOR(S) : Sean S. Stroud and Michael J. Piovoso Page 1 of 1

It is certified that error appears in the above-identified patent and that said Letters Patent is hereby corrected as shown below:

In the Claims

Claim 11, Column 9, Line 19: change "integrating fiber" to --integrating filter--

Signed and Sealed this
Twentieth Day of March, 2018

Andrei Iancu
*Director of the United States Patent and Trademark Office*